UNITED STATES PATENT OFFICE.

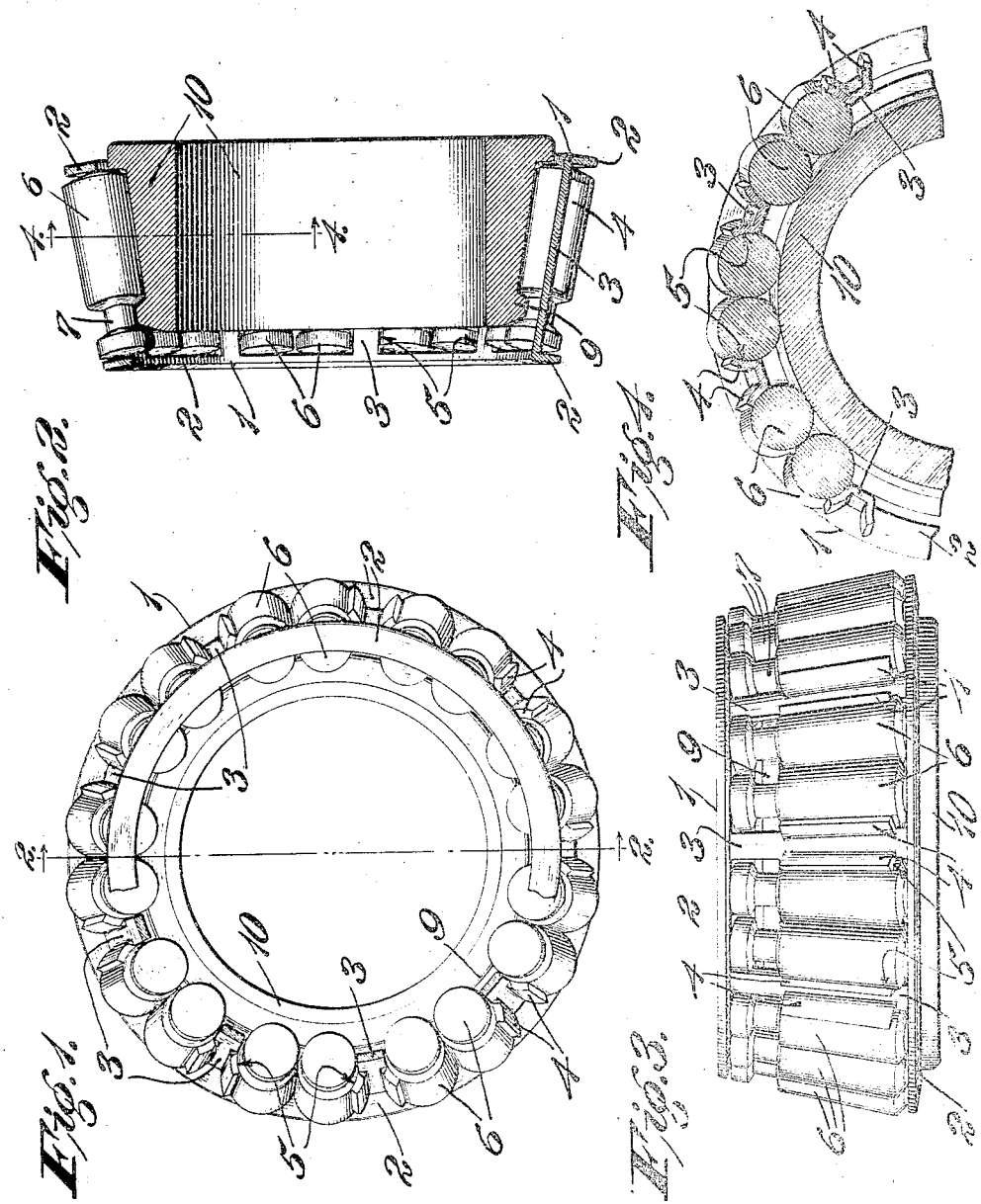

TRACY V. BUCKWALTER, OF CANTON, OHIO, ASSIGNOR TO THE TIMKEN ROLLER BEARING COMPANY, OF CANTON, OHIO, A CORPORATION OF OHIO.

DOUBLE-POCKET CAGE FOR ROLLER-BEARINGS.

1,282,184.      Specification of Letters Patent.      Patented Oct. 22, 1918.

Application filed August 20, 1917. Serial No. 187,051.

*To all whom it may concern:*

Be it known that I, TRACY V. BUCKWALTER, a citizen of the United States, and a resident of the city of Canton, county of Stark, and State of Ohio, have invented a new and useful Improvement in Double-Pocket Cages for Roller-Bearings, of which the following is a specification.

This invention relates to roller bearings, and consists in the construction and combinations of parts hereinafter described and claimed.

Its objects are to accommodate a larger number of rollers in a cage of a given size than is possible with other cages, and to provide a cage which is strong and durable, and simple and economical to manufacture.

In the drawing, which forms a part of this specification and wherein like reference numerals refer to like parts wherever they occur, Figure 1 is an end view of a bearing embodying my invention;

Fig. 2 is a longitudinal section thereof on the line 2—2 in Fig. 1;

Fig. 3 is a side view of the assembled bearing; and

Fig. 4 is a cross-section on the line 4—4 in Fig. 2.

A conical cage 1 consists of annular flanges 2 connected at their inner circumference by bridges 3. The bridges 3 have outwardly turned wings 4 extending the greater part of their length and forming pockets 5. The bridges 3 are spaced apart so that each pocket 5 is large enough to contain two rollers 6. The wings 4 extend substantially the length of the bearing surfaces of the rollers 6, and their surfaces are concave in order to conform to the rollers. The rollers are of conical form with narrow necks 7 adapted to coöperate with an annular rib 9 on the smaller end of the inner bearing member 10. The parts of the bearing are assembled by deflecting the flat portion of the bridges 3 adjacent to the smaller annular flange sufficiently to permit the cage 1 and rollers 6 to be forced over the rib 9 of the inner bearing member 10. The bridges and wings are then forced into proper working position.

Owing to the fact that each pocket is made large enough to accommodate two rollers, less material is usually needed for the construction of the bridges under the wings than would be required with a cage wherein each pocket accommodated a single roller. As a consequence, more rollers may be used and still have wings of ample width. It is noted that the wings are illustrated as terminating short of the ends of the bridges. The principal reason for this construction is to cheapen the cost of perforating and winging the cages, as this construction lends itself to a long continuance of the life of the punches and dies. So, too, by putting two rollers in each pocket, rollers of smaller diameter may be used than would be possible if a single roller were in each pocket.

The cage is made of a single piece of pressed steel. The cage as shown in the drawing is used with tapered rollers, but it is adapted for use with cylindrical rollers. Other modifications may be made without departing from the invention.

I claim the following as my invention:

1. A one-piece cage of pressed steel comprising annular end flanges disposed crosswise of the axis of the cage connected at their inner circumferences by bridges, said bridges having wings terminating short of said end flanges and forming pockets for the rollers, each of said pockets containing two rollers, the wings of each bridge extending outwardly in diverging curves conforming to the surface of the rollers whereby the outer throat of the pocket is narrower than the sum of the diameters of the rollers therein.

2. A conical cage for roller bearings consisting of annular end flanges disposed crosswise of the axis of the cage connected at their inner circumferences by bridges, said bridges having outwardly extending wings, arranged to form pockets, each of which receives and retains two contacting rollers.

3. A cage comprising annular end flanges connected at their inner circumferences by bridges, said bridges having outwardly extending wings along their margins and terminating short of said end flanges, said wings being spaced apart to form pockets adapted to receive and retain two contacting rollers each, and the inner surfaces of said wings conforming to said rollers.

4. A roller bearing comprising an inner bearing member, a rib near one end thereof, rollers having grooves to coöperate with said rib, and a cage for said rollers, said cage comprising annular end flanges connected at their inner circumferences by bridges, said bridges having wings extending outwardly to form pockets for the rollers, each of said pockets containing two rollers, and the inner surfaces of said wings conforming to the adjacent surfaces of said rollers, whereby they prevent accidental dislocation of said rollers from said cage and inner bearing member.

5. A roller bearing comprising an inner bearing member, a rib near one end thereof, rollers having grooves to coöperate with said rib, and a cage for said rollers, said cage comprising annular end flanges connected at their inner circumferences by bridges, said bridges having wings extending outwardly to form pockets for the rollers, each of said pockets containing a plurality of rollers, and the inner surfaces of said wings conforming to the adjacent surfaces of said rollers, whereby they prevent accidental dislocation of said rollers from said cage and inner bearing member.

6. A one-piece cage of pressed steel comprising annular end flanges connected by bridges, said bridges having wings terminating short of said end flanges and forming pockets, each of which contains two contacting rollers, the outer throat of the pocket being narrower than the sum of the diameters of the rollers therein.

7. A roller bearing comprising an inner bearing member having an annular rib near one end, rollers having grooves to coöperate with said rib, and a cage for said rollers, said cage comprising annular end flanges connected by bridges, said bridges having wings terminating short of said end flanges, said wings forming pockets adapted to receive and retain two rollers each.

8. The process of assembling the parts of a conical roller bearing wherein two conical rollers are retained in each pocket of a cage between inner and outer bearing members which consists in deflecting the bridge members of the cage to widen the pockets at their narrower ends, placing two rollers in each pocket, moving said inner bearing members endwise into position, restoring said bridge members to initial position, and positioning the outer bearing member.

9. The process of assembling the parts of a conical roller bearing wherein two grooved conical rollers are retained in each pocket of a cage between inner and outer bearing members, the inner of which has an annular rib thereon, which consists in deflecting the bridge members of the cage to widen the pockets at their narrower ends, placing two rollers in each pocket, moving said inner bearing member endwise into position, restoring said bridge members to initial position, and positioning the outer bearing member.

Signed at Canton, Ohio, this 14th day of August, 1917.

TRACY V. BUCKWALTER.